United States Patent [19]

Whalen

[11] 4,194,575
[45] Mar. 25, 1980

[54] MULTIPLE ROTARY HOE AND SUPPORT ARMS

[75] Inventor: Bernard F. Whalen, Colchester, Ill.

[73] Assignee: Yetter Manufacturing Company, Colchester, Ill.

[21] Appl. No.: 21,437

[22] Filed: Mar. 19, 1979

Related U.S. Application Data

[63] Continuation of Ser. No. 859,003, Dec. 9, 1977, abandoned.

[51] Int. Cl.² ............................................. A01B 39/08
[52] U.S. Cl. ................................... 172/551; 172/573; 172/451
[58] Field of Search ............... 172/705, 707, 708, 710, 172/544, 551, 570, 572, 573, 462, 500, 451

[56] References Cited

U.S. PATENT DOCUMENTS

| 1,062,660 | 5/1913 | Nugent | 172/573 |
|---|---|---|---|
| 2,177,026 | 10/1939 | Nightenhelser | 172/462 |
| 2,477,229 | 7/1949 | Bean | 172/462 |
| 2,700,926 | 2/1955 | Goit | 172/573 |
| 2,701,512 | 2/1955 | Haynes | 172/573 |
| 3,608,646 | 9/1971 | Ryan | 172/500 |
| 3,627,063 | 12/1971 | Ryan | 172/572 |
| 3,635,291 | 1/1972 | Tomanek | 172/573 |
| 3,734,201 | 5/1973 | Zaun | 172/573 |

*Primary Examiner*—Richard J. Johnson
*Attorney, Agent, or Firm*—McWilliams, Mann & Zummer

[57] ABSTRACT

A multiple rotary hoe including individual hoe wheels mounted in front and rear rows with an individual support arm for each wheel and all of the support arms having a common axis mounted on a single pivot shaft for independent pivoting action in response to upward and downward movements of the hoe wheels with such movements counteracted by spring means exerting downward pressure on each support arm independently of all of the remaining arms.

11 Claims, 7 Drawing Figures

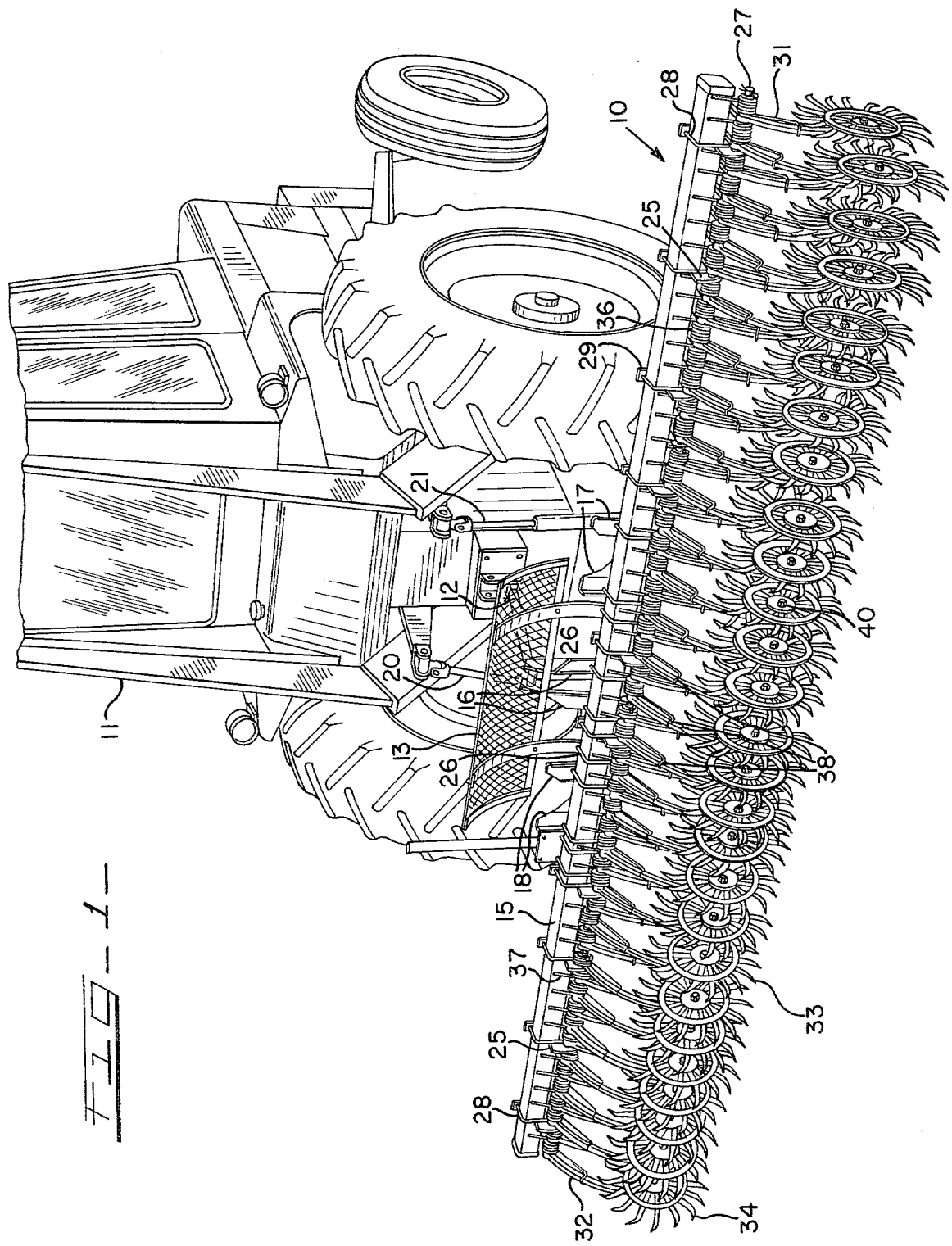

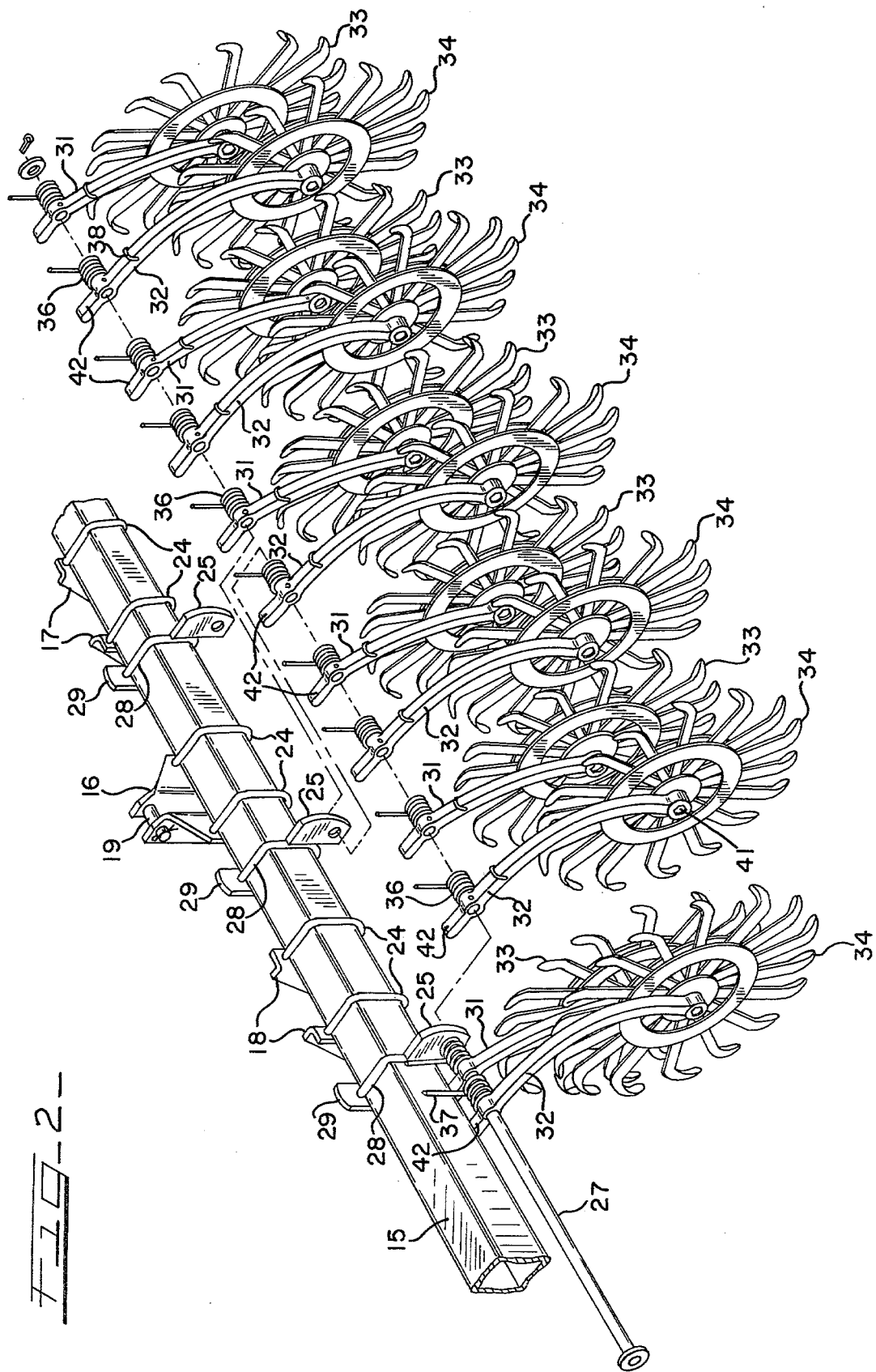

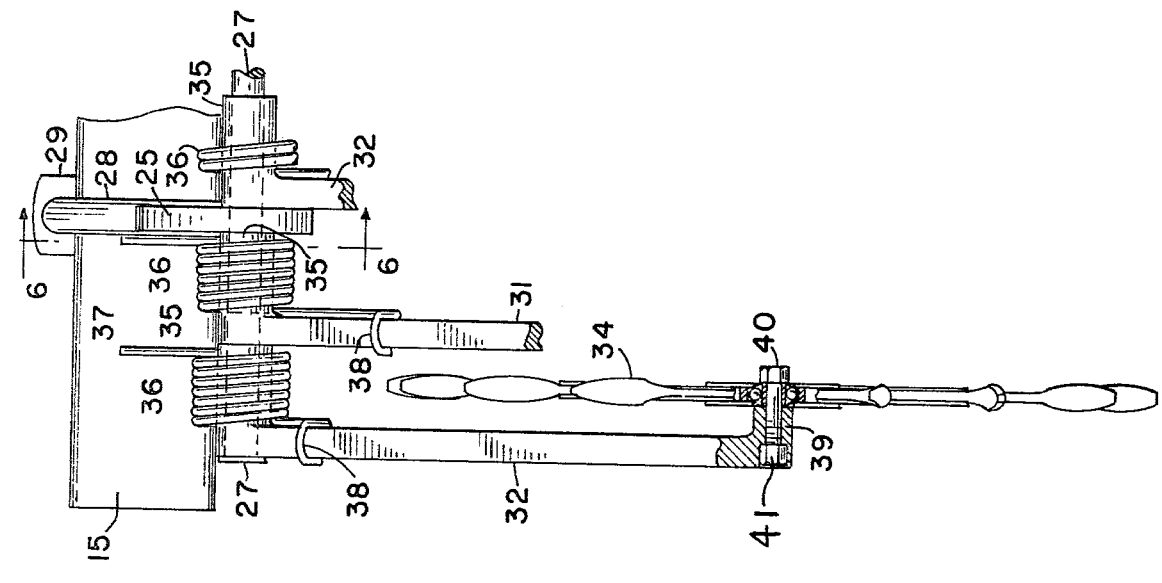
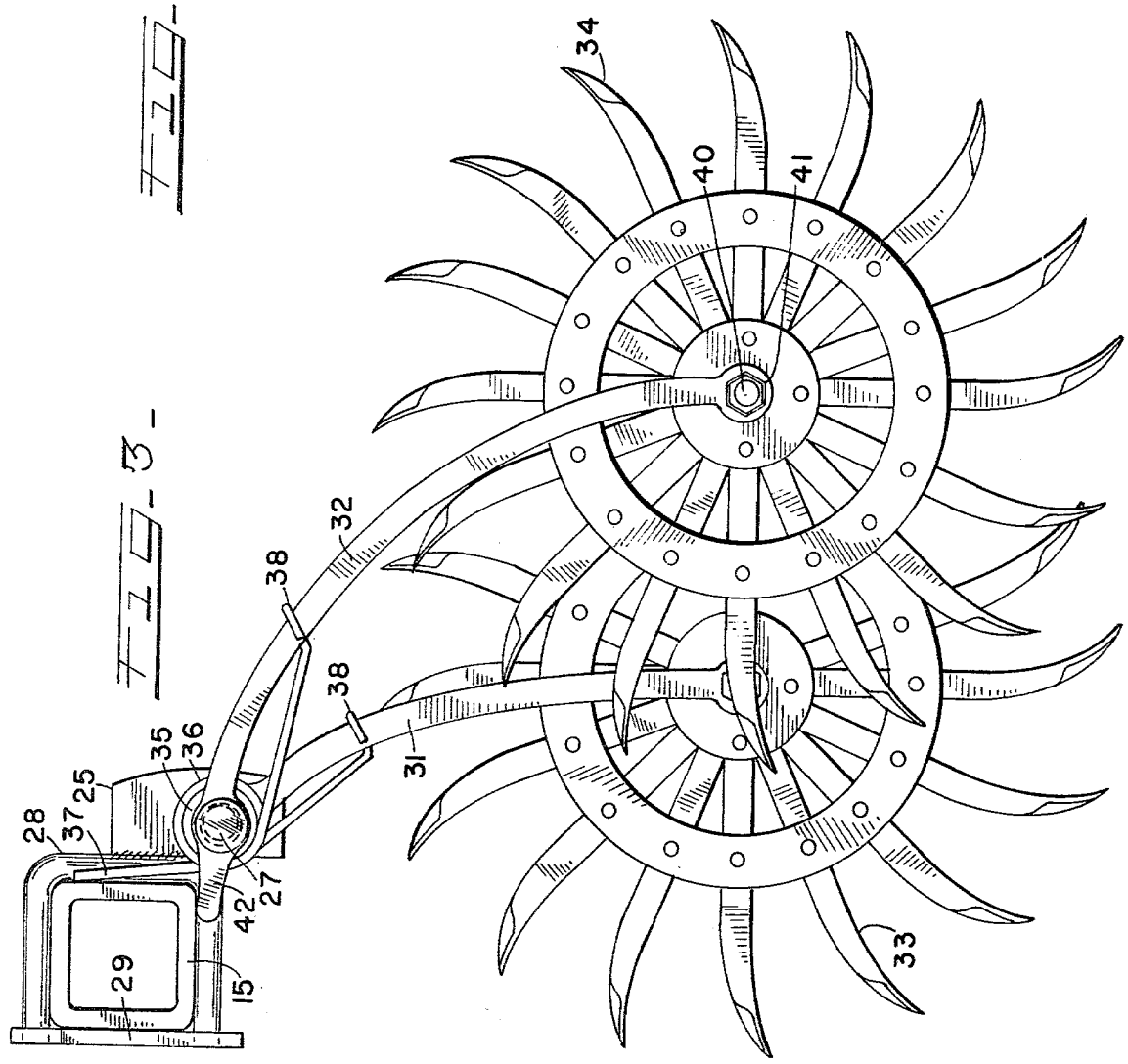

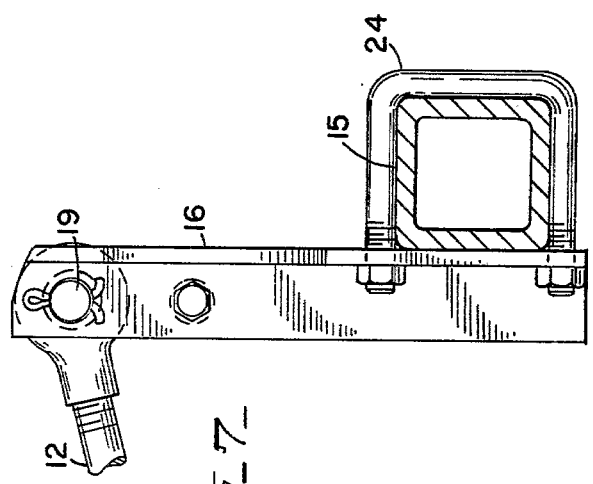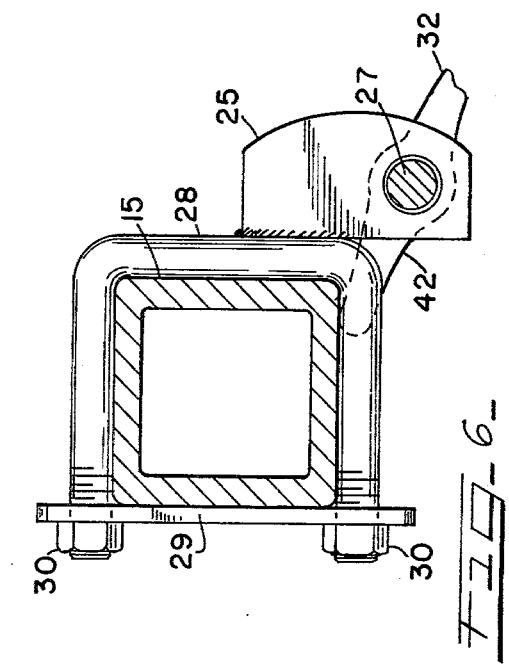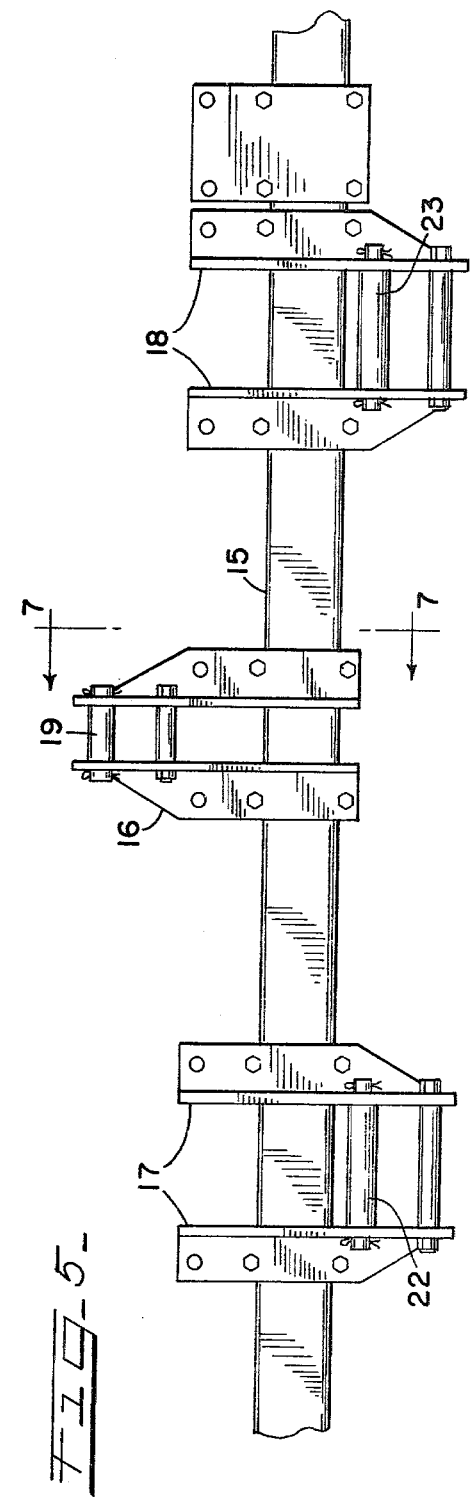

MULTIPLE ROTARY HOE AND SUPPORT ARMS

This is a continuation, of application Ser. No. 859,003, filed Dec. 9, 1977 now abandoned.

BACKGROUND OF THE INVENTION

Heretofore, rotary hoe wheels have been mounted in gangs for operation in groups wherein multiple hoe wheels were supported, or carried, by each operating arm whereby each hoe wheel always functioned in direct association with one or more connected hoe wheels with the result that one hoe wheel could not function independently of all of the other hoe wheels. These group mountings did not enable the hoe wheels thus connected to function individually independently of all other hoe wheels in the assembly in following the ground contours over which the hoe was operated.

Some hoe mechanisms involved frame structure mounting hoe wheels in individual groups with each group having its own pivot mounting shaft and with various of the groups having different operating axes so that the hoe wheels were not all mounted for operation on the same axis. Such individual groups of hoe wheels were disposed in spaced relation with some groups in advance of others so that the total number of hoe wheels did not function as an integrated assemblage but each group continued to operate as a separate group as distinguished from individual operation of each hoe wheel.

Other rotary hoe arrangements involved mountings where no provision was made for vertical displacement individually even though the hoe wheels were disposed in rows spaced in the direction of movement of the towing vehicle. In some the hoe wheels were mounted in spaced rows such that upon vertical movements the spacing of the rows of wheels increased or decreased as the hoe wheels moved up or down. Another type of hoe arrangement involved the mounting of rotary hoe wheels in tandum sections pivoted to a frame for rocking movements about an axis extending longitudinally of the frame. Another hoe wheel arrangement involved mounting of the wheels in tandem gangs by means of leaf springs. Not one of these prior art rotary hoe arrangements provided a pivoted mounting of each hoe wheel on a separate support arm where all of the hoe wheels and support arms were pivotally mounted on the same axis on a single mounting shaft with the hoe wheels disposed in rows spaced in the direction of movement of a towing vehicle.

SUMMARY OF THE INVENTION

This invention provides a rotary hoe mechanism utilizing multiple hoe wheels disposed in two rows, one row in advance of the other row, with each of the hoe wheels pivotally mounted by means of its own operating, or support arm, with all of the support arms pivotally mounted on a single pivot shaft whereby all of the hoe wheels are supported for operation about the same axis and the hoe wheels are capable of independent relative vertical movements in response to ground contours as the hoe is drawn by a towing vehicle.

The vertical pivotal movements of the hoe wheels and supporting arms are controlled by separate spring devices which engage each operating arm to exert a downward pressure on the respective hoe wheels individually. The assembly of the entire hoe mechanism, including the pivot shaft and springs, is mounted on a supporting frame member which extends transversely of a towing vehicle and which incorporates a hitch for connection with the vehicle. The operating arms are adapted to engage the supporting frame to limit pivoting movements of the arms and hoe wheels about the pivotal axis.

The general arrangement is such that the hoe wheels and their supporting arms operate independently so that the springs can apply a constant downward pressure on the arms and wheels more or less equally and whereby the hoe wheels are free to deflect individually in response to any obstacle encountered in being drawn over the ground being worked. With this arrangement each hoe wheel is caused effectively to accomplish the same amount of work on the soil so that the production obtained from the hoe assembly is maintained at a maximum. Each hoe wheel, while performing a maximum amount of work, may be deflected and pass over an obstacle without diminishing the overall effectiveness of the hoe mechanism as a whole.

OBJECTS OF THE INVENTION

It is a primary purpose of the invention to incorporate rows of hoe wheels in a rotary hoe mechanism wherein a series of operating arms support one row of hoe wheels and a separate series of operating arms support another row of hoe wheels with all of the operating arms pivoting about the same axis.

The principal object of the invention is the provision of rotary hoe mechanism having a first row of hoe wheels and a second row of hoe wheels in advance of the first row with an individual operating arm pivotally supporting each hoe wheel from a single pivot shaft.

An important object of the invention is to provide a rotary hoe assembly wherein multiple hoe wheels are disposed in front and rear rows with operating arms independently mounting each wheel for operating movement about a single pivot axis.

Another object of the invention is the provision of a rotary hoe arrangement having individually mounted hoe wheels in separate rows with mounting arms pivotally supporting the wheels from an axis affording independent relative displacement of each wheel in response to ground contours.

A further object of the invention is to provide a rotary hoe having hoe wheels separately and independently mounted on respectively associated pivot arms for pivotal support in a single pivot axis with independent spring means exerting a downward pressure on each arm with a limit stop restricting downward movement of the several arms.

A still further object of the invention is the provision of a rotary hoe including a mounting frame, a pivot shaft on the frame, a plurality of support arms pivotally mounted on the shaft, a hoe wheel carried by each support arm and spring means operative between the mounting frame and each support arm exerting a downward pressure on each hoe wheel.

DESCRIPTION OF THE DRAWINGS

The foregoing and other and more specific objects of the invention are attained by the construction and arrangement illustrated in the accompanying drawings wherein FIG. 1 is a general perpsective view of the rotary hoe of this invention mounted on a towing vehicle of the usual tractor type;

FIG. 2 also is a perspective view showing portions of the rotary hoe to somewhat larger scale and with the parts illustrated in exploded relationship;

FIG. 3 is an end elevational view of the rotary hoe showing the relationship of the two series of operating arms pivotally mounted on one pivot shaft and supporting the two rows of hoe wheels with one row in advance of the other row;

FIG. 4 is a detail rear elevational view of a hoe wheel and supporting operating arm with the torsional spring for pressing the arm and wheel downwardly;

FIG. 5 is a detail front elevational view of the transverse supporting frame member for the hoe mechanism showing three hitch connecting brackets for mounting the hoe relative to a towing tractor;

FIG. 6 is a detail cross sectional view taken on the line 6—6 of FIG. 7, through the supporting frame member, showing one of the pivot bearings for the pivot shaft mounted on the member by U-bolts; and FIG. 7 is cross sectional view taken on the line 7—7 of FIG. 5 showing the central hitch mounting bracket in side elevation.

DESCRIPTION OF PREFERRED EMBODIMENT

In the drawing the rotary hoe 10 is shown attached to a tractor type towing vehicle 11 by means of hitch mechanism generally indicated by the reference 12. A safety screen 13 is mounted on the hoe in a rearwardly inclined position by means of brackets 14 rigidly secured to a transverse supporting frame member 15 by means of U-bolts 26 for the safety and protection of the tractor operator. The hitch mechanism is operatively connected with the transverse frame member 15 through the medium of vertically disposed flanged brackets 16, 17 and 18 disposed in pairs at the center of the frame member and spaced upon opposite sides thereof respectively. The flanges of the respective brackets are spaced apart, as best indicated in FIG. 5, thereby forming jaws between which the hitch members are mounted. The central link 12 of the hitch is connected between the jaws of the center bracket 16 and pivotally mounted on pin 19. Supporting links 20 and 21 are pivotally connected by means of pins 22 and 23 to the side brackets 17 and 18 and may be hydraulically actuated for raising and lowering the complete hoe assembly. The brackets 16, 17 and 18 are securely mounted on the transverse frame member 15 by means of similar U-bolts 24 clamping the respective bracket members to the frame member in the desired spaced relation.

As best indicated in FIGS. 2 and 6, the transverse frame member 15 also mounts a plurality of pivot bearings 25 which support a pivot shaft 27 on the frame member. The pivot shaft may be in one or more sections, as preferred, and is disposed rearwardly of the rear face of the frame member and adjacent to the bottom of the frame member 15 as best indicated in FIGS. 3 and 6. The pivot bearings 25 comprise plate-like members welded edgewise to U-bolts 28 which are mounted on the member 15 by a clamp plate 29 at the front face of the frame member and secured by nuts 30. The pivot shaft 27 extends through all of the aligned pivot bearings 25 on a single axis where it is positioned and supported by the pivot bearings.

Pivotally mounted on the pivot shaft 27 are two series of operating arms 31 and 32 rotatably supporting a hoe wheel 33 on each of the arms 31 of the one series of arms 31 and a hoe wheel 34 on each of the arms 32 of the other series of arms 32 so that the hoe wheels are also disposed in two series 33 and 34 with the one series 33 in advance of the series 34 as the hoe is drawn by the tractor 11. The operating arms 31 and 32 are separate and independent and are individually mounted on the pivot shaft 27 so that each is free to pivot on the shaft independent of all others so that the effect is to enable each hoe wheel 33 or 34 to function independently whereby in traversing the terrain being worked the hoe wheels may each be deflected about the pivot axis 27 without translating this movement to any other hoe wheel, or its mounting.

Each of the operating arms 31 and 32 has an integral hub 35 (see FIG. 4) at its upper end and by means of which the arms are pivotally mounted on the pivot shaft 27. This upper hub extends entirely to one side of the respectively associated operating arm and as clearly shown in this Figure acts as a spacer between the arms. It will readily be seen that hub 35 on an operating arm 32 for instance extends laterally to a point bearing against the next adjacent arm 31 thereby serving to maintain the lateral spacing of the arms and where a pivot bearing 25 intervenes, the end of the hub bears against the face of the pivot bearing to insure the proper spacing. On the opposite side of the pivot bearing plate, as illustrated in this Figure, it will be seen that the next operating arm 32 has its face in engagement with that side of the plate 25 and the end of its hub 35 will bear against the next operating arm 32 thus in this way maintaining the operative spacing of the arms and the hoe wheels supported thereby all the way across the entire width of hoe assembly.

The upper hub 35 on each operating arm also provides for the mounting of a torsion spring 36 which is disposed to exert a downward pressure on each arm independently of all of the other arms assembled on the pivot shaft 27. The spring 36 encircles the hub 35 and has an upstanding arm 37 which engages the rear face of the frame member 15 to take the reaction of the spring and the opposite end of the spring is shaped to engage over the associated operating arm, as at 38, whereby to exert the desired pressure in a downward direction and against which the individual hoe wheels may be deflected upwardly where an obstacle may be encountered in the terrain under cultivation.

The lower end of each of the operating arms 31 and 32 is provided with an integral bottom hub 39 extending to the same side of the respective arms as the upper hub 35 and this arrangement also is best illustrated in FIG. 4. This hub is of less lateral extent than the hub 35 and is adapted to have the respective hoe wheels 33 or 34, mounted relatively thereto so that each hoe wheel is disposed more or less centrally of the upper hub 35 whereby a stable mounting of the wheels is obtained without any eccentricity. Each hoe wheel 33, or 34, is rotatably mounted on an axle 40 which extends through the hub 39 and is fixedly secured by a threaded nut 41. As shown herein, the fastening nut 41 is recessed flush with the face of the operating arm at the side opposite the hub 39 and the opposite end of the axle 40 may be squared, or shaped hexagonally for the purpose of turning the axle for threading it into the nut 41. FIGS. 3 and 4 are referred to for revealing this relationship.

All of the operating arms of both series 31 and 32 are adapted to maintain both series of hoe wheels 33 and 34 in substantially similar operating positions relative to a terrain over which the hoe is operated while leaving the individual hoe wheels free to deflect upon encountering an obstacle of any kind whether it be a rock, or uneven ground or for whatever reason. The positioning of the hoe wheels relative to the terrain is obtained by means of a stop member 42 on each operating arm 31 and 32, which extends beyond the pivot axis 27 to underlie the under side of the trasverse frame member 15, against which each stop member bears to limit the downward movement of the operating arms and thus locate all of the hoe wheels 33 and 34 in approximately the same operative position relative to the ground.

From the foregoing it will be seen that a rotary hoe mechanism has been provided wherein a plurality of side-by-side wheels have been arranged in two series involving one row of hoe wheels in advance of the other row and wherein all of the wheels are supported by individual operating arms pivotally mounted on the same pivot axis with stop means for limiting downward pivoting of the operating arms whereby all of the hoe wheels are disposed in the same operative position relative to the ground. Each of the operating arms has an upper hub extending to one side of the arm for pivotally mounting the arm on a pivot shaft and a lower hub extending to the same side of the arm for mounting a respectively associated hoe wheel on an axle secured in the bottom hub. The hoe wheels thus mounted are disposed in a plane more or less centrally located with respect to the upper hub whereby to avoid eccentrically applied stresses on the operating arms. Springs pressing the operating arms and hoe wheels downwardly are mounted on the upper hubs and react between the face of transverse frame and each operating arm to maintain the downward pressure while permitting upward deflection of the individual hoe wheels and supporting arms in response to surface irregularities.

What is claimed is:

1. A rotary hoe arrangement including two rows of hoe wheels with one row in advance of the other row, means mounting each hoe wheel independently for individual operative ground contact independently of all other hoe wheels, said means comprising a series of independent operating arms respectively supporting the hoe wheels of one of said rows, and a series of independent operating arms respectively supporting the hoe wheels of the other row, each of said hoe wheels being mounted on and supported by an operating arm individual thereto, all of said operating arms being pivotally mounted on pivot shaft means, means mounting said shaft means on said frame member comprising a plurality of laterally spaced pivot bearings secured to said member, spring means individual to each of said operating arms on said pivot shaft means and operative between said frame member and each operating arm to exert pressure on said operating arm individually and which yields to upward movement of the arms whereby each hoe wheel is individually urged into contact with the ground, and stop means on each operating arm which engages said frame member to dispose all of said hoe wheels in both of said rows in the same operative position, said arms and stop means being formed and disposed to locate said hoe wheels in said respective rows and whereby said hoe wheels are adapted to function independently in traversing ground being worked so that each wheel may be deflected about said pivot shaft means without translating this movement to any other wheel.

2. A rotary hoe arrangement as set forth in claim 1 wherein said pivot bearings comprise vertical plate-like members secured edgewise to respectively associated U-bolts, said U-bolts being secured to the frame member by clamp plates at the front face of the member, said pivot shaft extending through said plate-like pivot bearings with said operating arms disposed between the bearings.

3. A rotary hoe arrangement as set forth in claim 1 including a hitch comprising a three-point hitch disposed at the forward side of said supporting frame member, mounting brackets for the hitch mounted on the forward face of the frame member and secured by U-bolts, each of said brackets including spaced apart forwardly extending vertical flanges forming jaws, each of said jaws adapted to receive one point of said hitch, and connecting pins extending through said jaws.

4. A rotary hoe arrangement as set forth in claim 1 wherein each of said operating arms includes a lower hub extending to the side of the arm pivotally mounting each hoe wheel, and an upper hub extending to the side of the arm pivotally mounting the arm in said pivot shaft, the extent of the lower hub being such that the mounting of the hoe wheel on said lower hub is disposed substantially within the planes represented by the extent of the upper hub whereby each hoe wheel mounting is stabile and functions without eccentricity.

5. A rotary hoe arrangement as set forth in claim 1 wherein the spring means comprises a torsional spring which encircles each said upper hub exerting a desired downward pressure on the respectively associated arm, said upper hub comprising the sole spacer between adjacent arms.

6. A rotary hoe arrangement as set forth in claim 1 wherein each of said lower hubs has an axle secured in the hub and each said hoe wheel is pivotally mounted on said axle, and means securing each axle to the associated lower hub disposed substantially flush with a face of the respective operating arm.

7. A rotary hoe arrangement including two rows of hoe wheels with one row in advance of the other row, means mounting each hoe wheel independently for individual operative ground contact independently of all other hoe wheels, said means comprising a series of independent operating arms respectively supporting the hoe wheels of one of said rows, and a series of independently operating arms respectively supporting the hoe wheels of the other row, each of said hoe wheels being mounted on and supported by an operating arm individual thereto, all of said operating arms being pivotally mounted on a pivot shaft, means mounting said shaft on said frame member comprising a plurality of equally spaced pivot bearings secured to said member, spring means individual to each of said operating arms on said pivot shaft and operative between said frame member and each operating arm to exert pressure on said operating arm individually and which yields to upward movement of the arms whereby each hoe wheel is individually urged into contact with the ground, stop means on each operating arm which engages said frame member to dispose all of said hoe wheels in both of said rows in the same operative position, said hoe wheels and said two series of operating arms comprising the operating connection extending between said supporting frame member and ground level whereby said hoe wheels function independently in traversing ground being worked so that each wheel may be deflected about said pivot shaft without translating this movement to any other wheel, each of said operating arms including a lower hub extending to the side of the arm pivotally mounting each hoe wheel, and an upper hub pivotally mounting the arm on said pivot shaft, the extent of the lower hub being such that the mounting of the hoe wheel on said lower hub is disposed substantially within the planes represented by the extent of the upper hub whereby each hoe wheel mounting is stabile and functions without eccentricity, said upper hub acting as a spacer between the operating arms and as a support for said spring means mounted thereon.

8. In a rotary hoe arrangement having a plurality of rotary hoe supporting arms wherein each rotary hoe is mounted on one of said arms, each arm being individually mounted on a pivot shaft carried by a supporting frame member, each said arm having at least one mounting hub pivoted on said shaft, a spring on said hub exerting pressure on the arm, a lower hub on each arm, an axle mounted in each lower hub, and fastening means for the axle disposed substantially flush with a face of the arm, said rotary hoe being pivotally mounted on said axle.

9. In a rotary hoe arrangement as set forth in claim 8 wherein said axle comprises a bolt having a hexagonal head and a hexagonal nut, one of said hexagonal members being mounted in a recess in the arm, said nut securing the rotary hoe on such bolt, said rotary hoe being mounted on a projecting portion of said axle extending beyond the lower hub.

10. In a rotary hoe arrangement as set forth in claim 8 wherein said arms are mounted in two series to dispose said rotary hoes in two series with one series in advance of the other series.

11. A rotary hoe arrangement including a row of hoe wheels with means mounting each hoe wheel independently for individual operative ground contact independently of all other hoe wheels, said means comprising a series of independent operating arms respectively supporting the hoe wheels of said row, each of said hoe wheels being mounted on and supported by an operating arm individual thereto, all of said operating arms being pivotally mounted on pivot shaft means, means mounting said shaft means on said frame member comprising a plurality of laterally spaced pivot bearings secured to said member, spring means individual to each of said operating arms on said pivot shaft means and operating arm to exert pressure on said operating arm individually and which yields to upward movement of the arms whereby each hoe wheel is individually urged into contact with the ground, and stop means on each operating arm which engages said frame member to dispose all of said hoe wheels in the same operative position, said arms and stop means being formed and disposed to locate said hoe wheels in said row and whereby said hoe wheels are adapted to function independently in traversing ground being worked so that each wheel may be deflected about said pivot shaft means without translating this movement to any other wheel.

* * * * *